United States Patent

Jouatel et al.

[11] Patent Number: 5,860,354
[45] Date of Patent: Jan. 19, 1999

[54] INFUSION MACHINE INCLUDING A WATER PURIFICATION DEVICE

[75] Inventors: Christian Bernard Jouatel, Raden; Francis Pierre Jacques Landais, deceased, late of Mamers, both of France, by Pierre Chevalier, legal representative

[73] Assignee: Moulinex S.A., Bagnolet, France

[21] Appl. No.: 586,713

[22] PCT Filed: Jul. 20, 1994

[86] PCT No.: PCT/FR94/00903

§ 371 Date: Apr. 5, 1996

§ 102(e) Date: Apr. 5, 1996

[87] PCT Pub. No.: WO95/03733

PCT Pub. Date: Feb. 9, 1995

[30] Foreign Application Priority Data

Jul. 29, 1993 [FR] France ..................... 93 09375

[51] Int. Cl.$^6$ ............................. A47J 31/06; A47J 31/24
[52] U.S. Cl. ........................ 99/286; 99/290; 99/306
[58] Field of Search ..................... 99/286, 306, 290; 426/433; 210/264, 282, 416, 3

[56] References Cited

U.S. PATENT DOCUMENTS 4,283,283  8/1981  Zimmerman ..................... 210/282
5,038,675  8/1991  HArtel ............................ 99/286
5,238,559  8/1993  Nieweg ........................... 210/264
5,370,041  12/1994  Lowe ............................. 99/286
5,393,548  2/1995  Heiligman ................... 210/264 X

FOREIGN PATENT DOCUMENTS 0 377 192  7/1990  European Pat. Off. .
2.207.092  6/1974  France .
42 00 566  7/1993  Germany .
900719    10/1991  Netherlands .
WO 92/16136  10/1992  WIPO .

Primary Examiner—Reginald L. Alexander
Attorney, Agent, or Firm—Young & Thompson

[57] ABSTRACT

An infusion machine including a cold-water container (1) which incorporates a water purification device (5) and which comprises a water outlet (2) connected to a water heater (3). The water purification device includes a removable cartridge (7) comprising a bottom part forming a cup (8) which is designed to be mounted sealingly in a suitable basin (10) formed in the bottom of the container, and in which is housed so as to be removable a filter sachet (15) containing a water purification substance (16), and a top part forming a cap (18) which is located in line with the cup (8) and which is able to close the latter, the cap (18) of the cartridge comprising at least one opening (42) through which the water from the container enters, and the cup (8) of the cartridge comprising at least one opening (51) through which the water flows into the water heater (3) after passing through the filter sachet (15) used particularly for electric coffee makers.

9 Claims, 6 Drawing Sheets

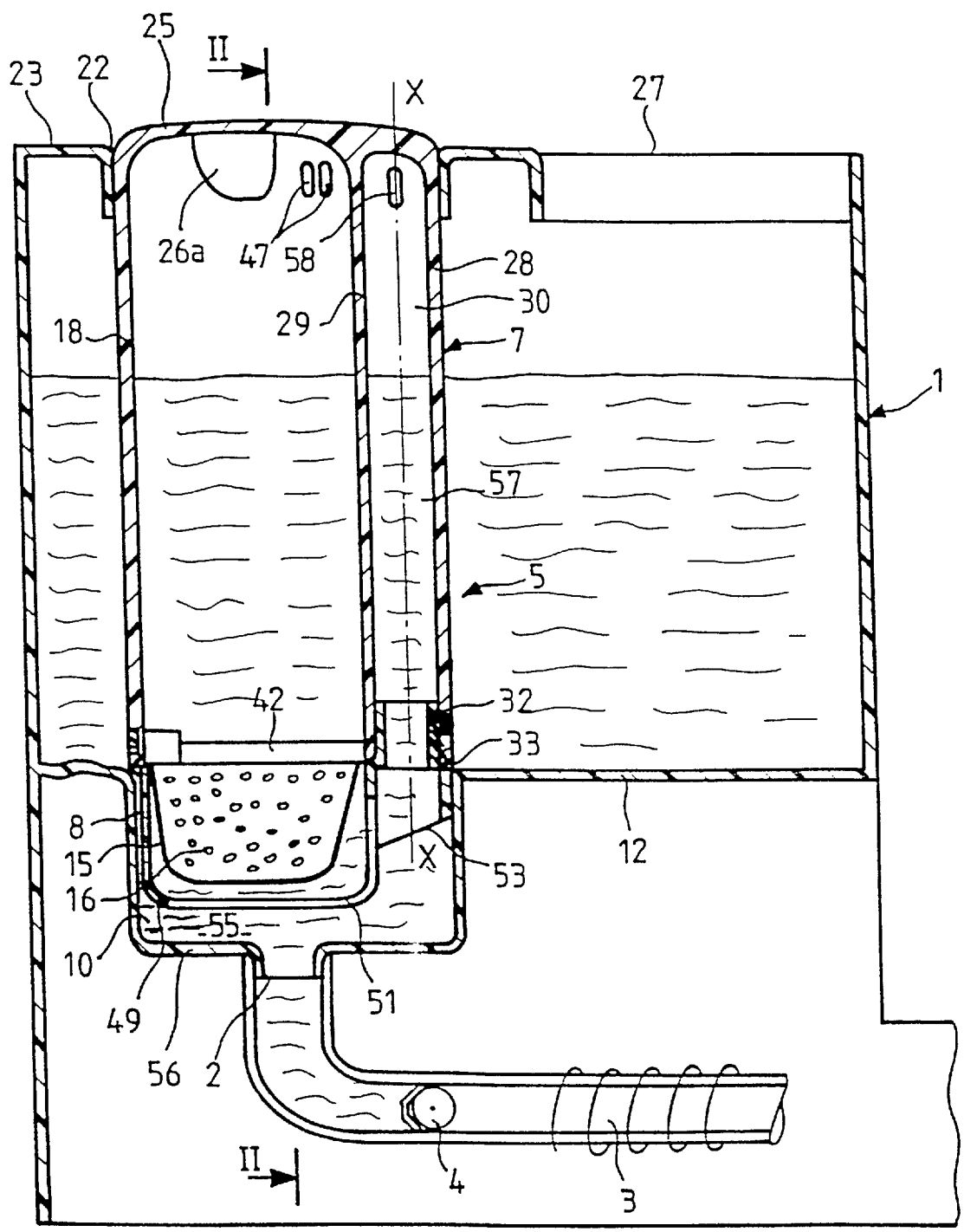

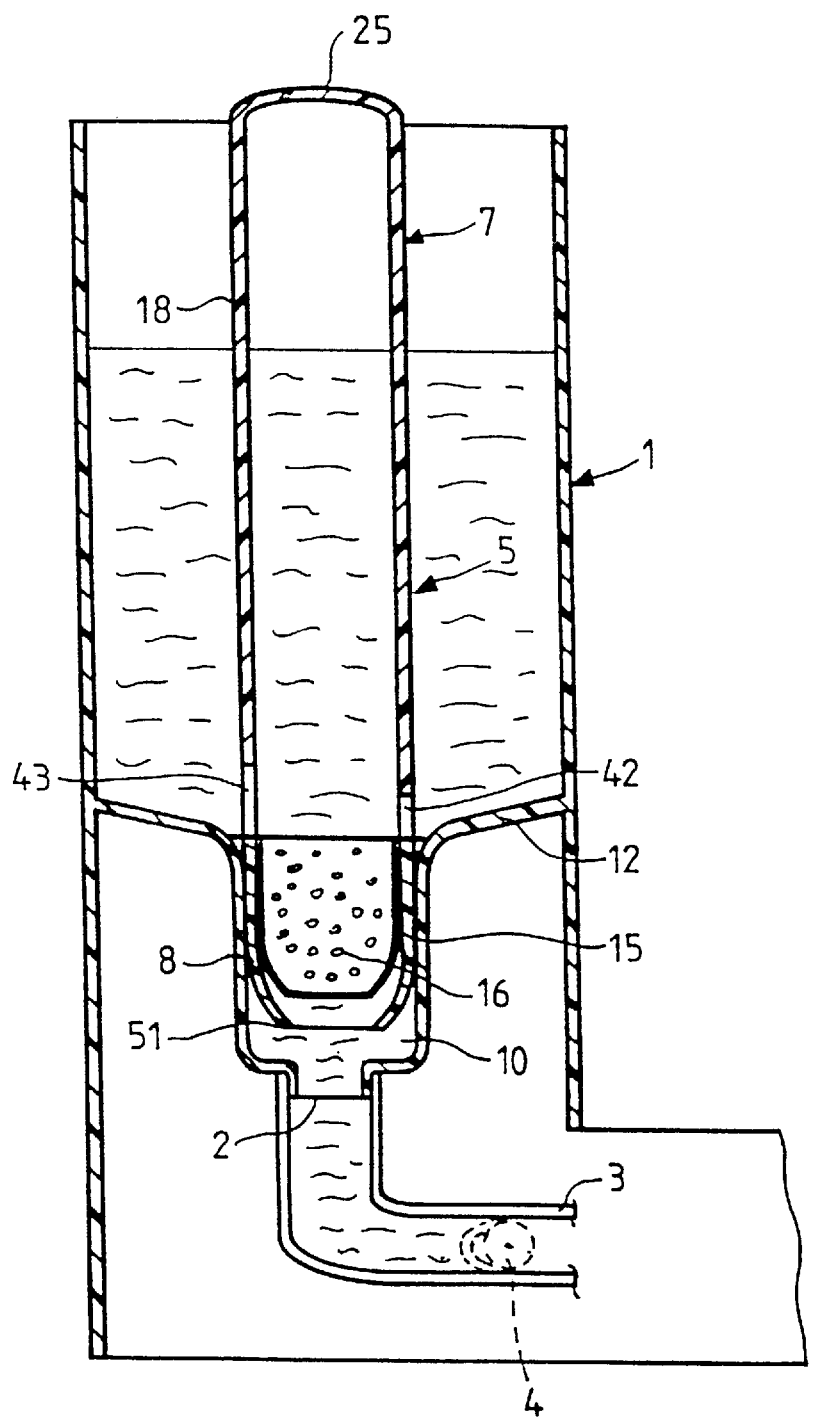

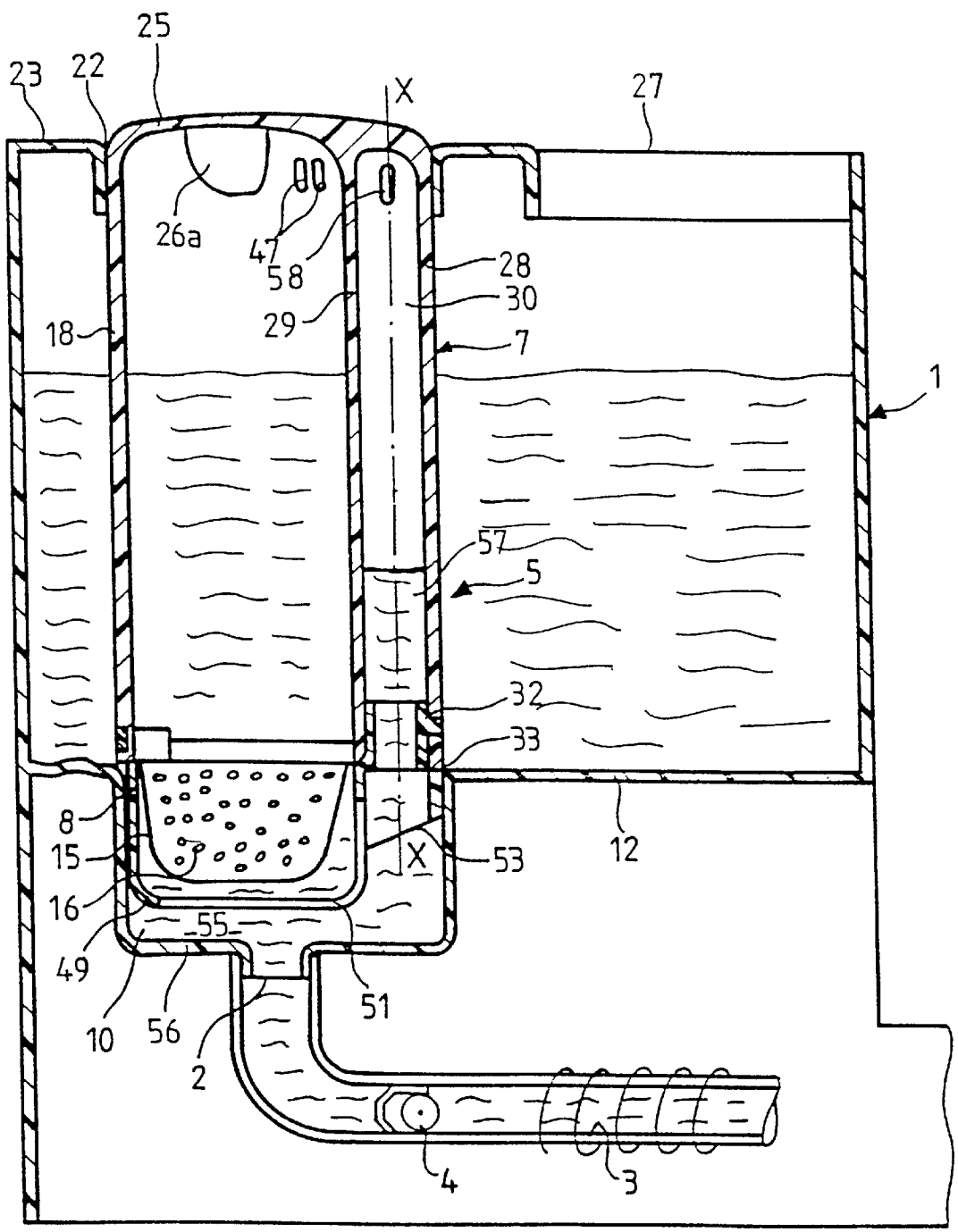

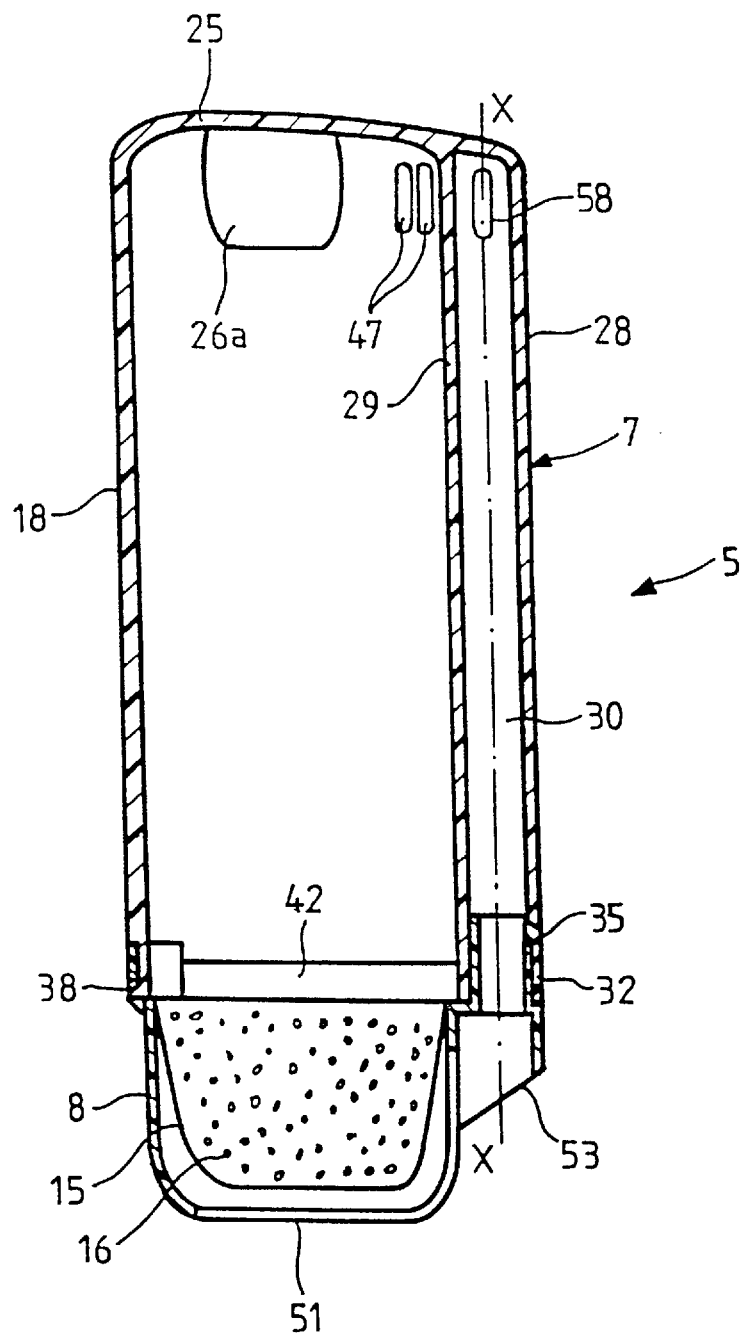
FIG_4

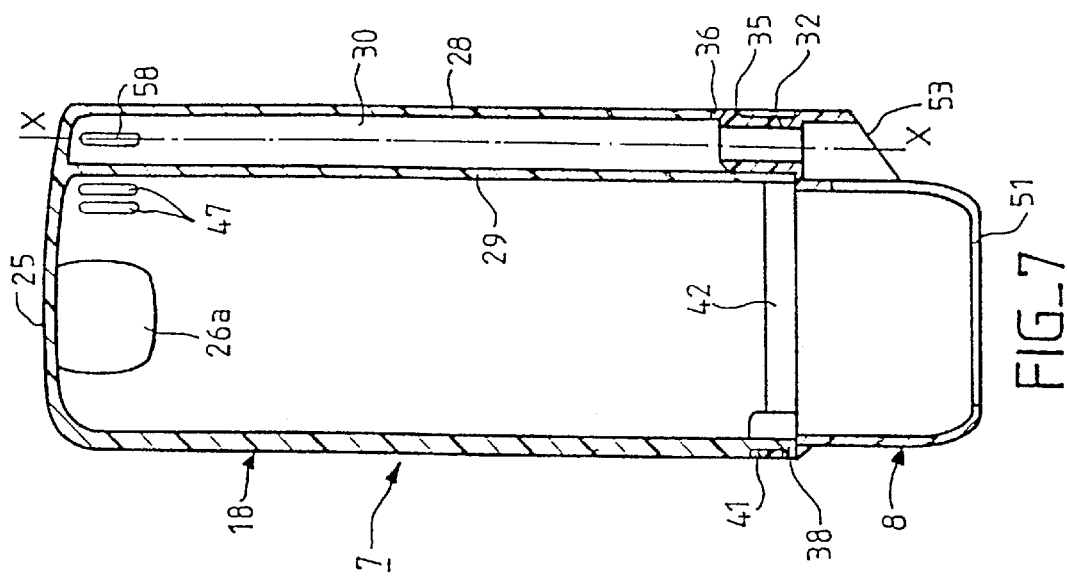
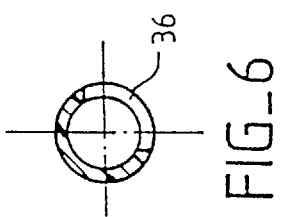
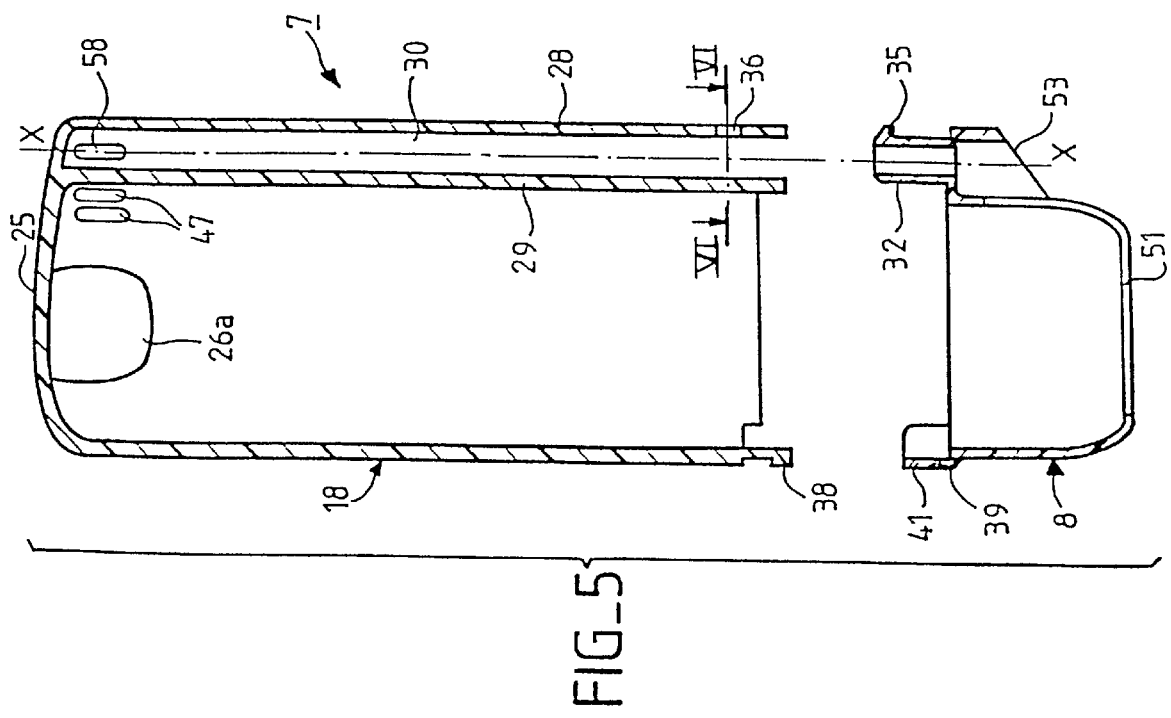

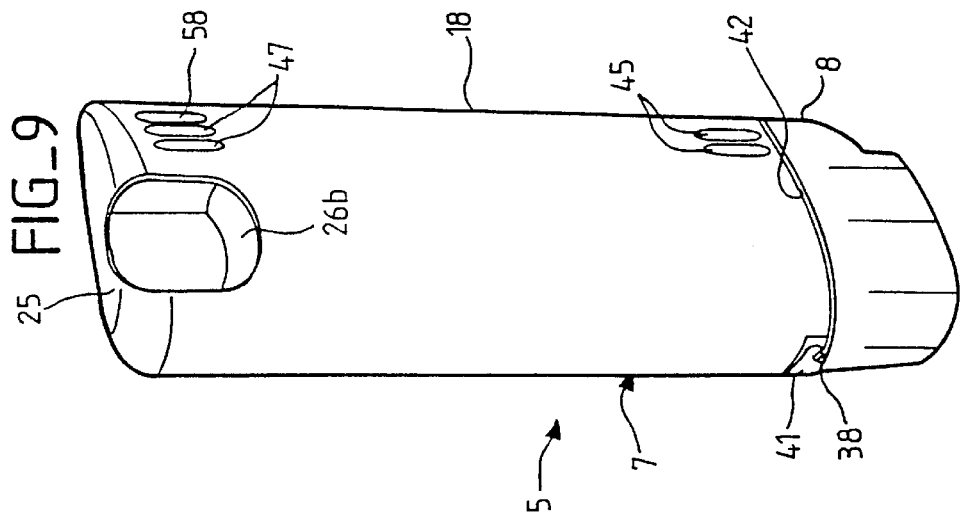
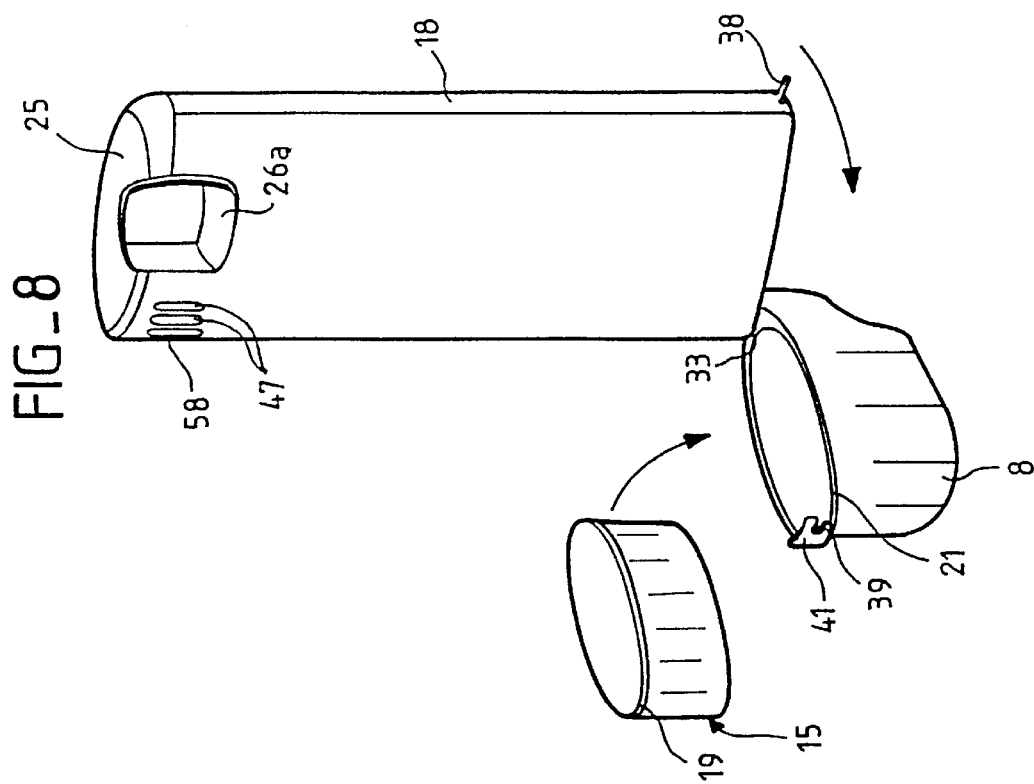

INFUSION MACHINE INCLUDING A WATER PURIFICATION DEVICE

FIELD OF THE INVENTION

The present invention concerns an infusion machine, such as a filter-type coffee maker for example, including a cold-water container which incorporates a water purification device and which comprises a water outlet connected to a water heater.

BACKGROUND OF THE INVENTION

In order to ensure that the infusion has a good aroma, the inclusion in the container of a filter suitable for purifying the water intended to supply the water heater is known. To this effect, a water purification filter of a known type consists of a removable cartridge made of relatively flexible material, filled with a water purification substance containing granules of activated charcoal. This cartridge, which forms a water purification filter, is placed, so as to fit closely, in a basin with a suitable shape, formed in the bottom of the container, and includes water inlet and outlet orifices through which the purified water, after passing through the filter cartridge, flows into the water heater.

However, because such a filter cartridge is applied against the walls of the shaped basin in the bottom of the container, the said filter cartridge is liable to deform as a result of an increase in its volume due to a swelling of the mass of the purification substance caused by the water which it retains, resulting in a certain amount of difficulty in extracting the filter cartridge from the container when it is being changed.

The aim of the invention is, notably, to mitigate these drawbacks.

SUMMARY OF THE INVENTION

According to the invention, the water purification device includes a removable cartridge comprising a bottom part forming a cup which is designed to be mounted sealingly in a suitable basin formed in the bottom of the container, and in which is housed so as to be removable a filter sachet containing a water purification substance, and a top part forming a cap which is located in line with the cup and which is able to close the latter, the said cap of the cartridge comprising at least one opening through which the water from the container enters and the said cup of the cartridge comprising at least one opening through which the water flows into the water heater after passing through the filter sachet.

By means of this design, it can be understood that the removable cartridge now constitutes a simple component for supporting and protecting the filter sachet, the latter being easy to extract from the cartridge. In addition, the cartridge and filter sachet form a unit which is hygienic and convenient for the user to employ.

According to another important characteristic of the invention, the top face of the filter sachet has a peripheral rim which is applied sealingly against the edge of the cartridge cup. This special positioning of the filter sachet ensures both a perfect seal between the cap and the cartridge cup and excellent holding of the filter sachet in position in the cartridge cup, thus ensuring continuously that all the water from the container passes through the filter sachet without any risk of detaching the latter.

BRIEF DESCRIPTION OF THE INVENTION

Other characteristics and advantages of the invention will, moreover, become clear from the following description, given by way of example, with reference to the accompanying drawings in which:

FIG. 1 is a partial view in vertical section of an infusion machine according to the invention, showing a non-return valve in the closed position;

FIG. 2 is a view in cross section along the line II—II in FIG. 1;

FIG. 3 is an identical view to FIG. 1, the non-return valve being in the open position;

FIG. 4 is a view in vertical section, to a larger scale, of the water purification device illustrated in FIGS. 1 and 3;

FIG. 5 is an exploded view, in vertical section, of the cup and cap constituting the cartridge of the water purification device illustrated in FIG. 4;

FIG. 6 is a view in cross section of a detail of the cap along the line VI—VI in FIG. 5;

FIG. 7 is a view in vertical section of the cup and cap in FIG. 5 after being assembled;

FIG. 8 is a perspective view of the water purification device, showing the cartridge in the open position ready to receive a filter sachet; and FIG. 9 is a perspective view of the water purification device in FIG. 8, after the filter sachet has been inserted and the cartridge closed.

DETAILED DESCRIPTION OF THE INVENTION

In FIGS. 1, 2 and 3, only part of an infusion machine has been shown, such as for example a filter-type coffee maker, namely: a cold-water container 1, the outlet 2 of which is connected to a water heater 3 via a non-return valve 4 shown diagrammatically and which incorporates a water purification device, designated by the general reference 5.

In a manner known per se, the outlet from the water heater feeds, through a rising hot-water tube, a spout for sprinkling a filter intended to receive ground coffee and disposed above a coffee collector.

According to the invention, the water purification device 5 (FIGS. 1, 2, 3 and 4) includes a removable cartridge 7, made of a plastic such as, for example, polypropylene, and comprising a bottom part forming a cup 8 which is mounted sealingly, for example through close contact, in a basin 10 (FIGS. 1, 2 and 3) with a suitable shape, formed in the bottom 12 of the container 1, and in which is mounted, so as to be removable, a filter sachet 15 containing a water purification substance 16, and a top part forming a cap 18 designed to close the cup 8.

The filter sachet 15 is made of a water-permeable material, such as, for example, a felt, and the water purification substance 16 which it contains is composed of granules of activated charcoal treated with silver salts; such a substance removes the taste and smell of chlorine, retains some of the organic impurities and prevents the proliferation of bacteria.

The filter sachet is held in place, sealingly, in the cup 8 of the cartridge 7 by means of a peripheral rim 19 (which can be seen more clearly in FIG. 8) formed on the flat top surface of the filter sachet 15 and which is applied against the edge 21 (FIG. 8) of the cup 8.

This way of holding the filter sachet in position in the cartridge cup is particularly advantageous, because it ensures that all the water will pass through the filter sachet without any risk of detaching the latter.

As shown in FIGS. 1 and 3, the cap 18 of the cartridge 7 has an elongate shape and extends vertically in line with the cup 8, projecting slightly through a suitable aperture 22 made in a cover 23 on the container 1. In addition, the cap 18 of the cartridge 7 has, on each side of its top part or projecting end 25, a slight indentation 26a, 26b respectively, more clearly visible in FIGS. 8 and 9, forming gripping means designed for the removal of the cartridge 7. At 27 in FIGS. 1 and 3 an aperture for filling with water, formed in the cover 23 of the container 1, is shown.

The cap 18 of the cartridge 7 has a lateral wall 28 and an internal wall 29 shaped so as to define, with this lateral wall 28, a cylindrical vertical channel 30, with an axis XX, the bottom part of which is intended to receive a hollow vertical journal 32, forming a hinge produced on the side of the top edge 33 of the cup 8 of the cartridge, so that the cap 18 is able to pivot about the journal 32 on the cup 8.

As shown in FIGS. 5 and 6, the journal 32 on the cup 8 of the cartridge 7 (without the filter sachet) has on its side a nose piece 35, designed to engage non-detachably in a substantially semi-circular slide 36 (FIG. 6) provided in the lateral wall 28 of the cap 18 of the cartridge 7, so as to form a non-detachable hinge.

The cup 8 and the cap 18 of the cartridge 7 also have removable fixing means, in this case of the bayonet type, consisting of a lug 38 formed at the base of the lateral wall 28 of the cap 18 and designed to snap into an appropriate notch 39 produced in a small vertical flange 41 formed on the edge of the cup 8, on the side opposite the journal 32; see FIG. 5.

FIG. 7 shows the cartridge 7 (without the filter sachet) once the cup 8 and cap 18 have been assembled and fixed together.

As can be seen in FIG. 2, two gaps 42, 43, formed by cut-out parts in the wall of the cap 18, are provided in the area where the cap 18 joins the cup 8 of the cartridge 7 and are intended for water coming from the container 1 to pass through in order to feed the filter sachet 15. Water can also pass inside the cap 18 of the cartridge 7 through additional openings 45 (FIG. 9), for example two in number, provided in the bottom part of the cap 18. Orifices open to atmosphere, for example two in number, made in the top part of the cap 18, are shown at 47.

In the embodiment illustrated in FIG. 1, the cup 8 of the cartridge 7 extends from the bottom 12 of the container 1 over only part of the depth of the basin 10 and has, on the one hand, in its base 49, an aperture 51 which extends laterally to open out in the channel 30, and on the other hand, in a lateral sloping surface, an opening 53 causing the channel 30 to communicate directly with the basin 10: the space 55 provided between the base 49 of the cup 8 of the cartridge and the base 56 of the basin 10, and also the channel 30, therefore constitute a buffer storage, referenced 57, located upstream of the non-return valve 4. This buffer storage 57, partially integral with the cartridge 7, has an orifice open to atmosphere 58 made in the top part of the cap 18 of the cartridge 7.

A water container of this type with an incorporated water purification device according to the invention functions as follows.

During the filling of the container 1, the non-return valve 4 being open, water enters the cap 18 of the cartridge 7 via the gaps 42, 43 and passes through the filter sachet 15, flowing, in a purified state, through the openings 51, 53 in the cup 8 of the cartridge, as well as through the outlet 2 from the container, to fill the water heater 3. During the heating of the water, the non-return valve 4 being closed, the hot water sprinkles the ground coffee present in the filter and at the same time the buffer storage 57 is filled with purified water until there is equilibrium between the water levels in the container 1, the cap 18 of the cartridge 7 and the buffer storage 57, as illustrated in FIG. 1. Following the opening of the non-return valve 4, the water heater 3 is then immediately supplied with purified water taken from the buffer storage 57 as illustrated in FIG. 3. This method of supplying the water heater by means of the buffer storage thus makes it possible to ensure a continuous flow of purified water without any pressure loss caused by the water purification substance contained in the filter sachet.

The filter sachet 15 is changed in the following manner, in response to any suitable indicator showing that the filter sachet has reached a state of saturation after being used a given number of times.

The user extracts the cartridge 7 from the container 1, doing so easily by means of the gripping means 26a–26b projecting from the cover 33 of the container, then releases the cap 18 by pivoting it anti-clockwise so as to open the cup 8 and then withdraws the filter sachet 15. After inserting a new filter sachet 15 into the cup 8 of the cartridge 7 and locking the cap 18 by pivoting it clockwise as illustrated in FIG. 8, the user then inserts the cartridge 7 (FIG. 9) into the container 1 of the coffee maker through the opening 22 in the cover 23 of the container; when the cartridge 7 is positioned in the container 1, FIG. 1, the new filter sachet 15 is ready for use.

We claim:

1. In an infusion machine including a cold-water container (1) which incorporates a water purification device (5) and which comprises a water outlet (2) connected to a water heater (3), the said water purification device (5) including a removable cartridge (7) comprising a bottom part forming a cup (8) which is designed to be mounted sealingly in a suitable basin (10) formed in the bottom (12) of the container (1), and which contains a water purification substance (16), and a top part forming a cap (18) which is located in line with the cup (8) and which is able to close it, the said cap (18) of the cartridge comprising at least one opening (42; 43) through which the water from the container enters, and the said cup (8) of the cartridge comprising at least one opening (51; 53) through which the water in a purified state flows into the water heater (3); the improvement wherein the water purification substance (16) is contained in a filter sachet (15) which is removably housed in the cup (8) of the cartridge (7) and which has a top face having a peripheral rim (19) which is applied sealingly against the edge (21) of the cup (8) of the cartridge (7), said rim (19) being held between the cap (18) and the cup (8).

2. Infusion machine according to claim 1, wherein the cap (18) of the cartridge (7) extends vertically at least over the entire height of the container (1) and has an end (25), a lateral wall (28) and a vertical internal wall (29) defining, with the said lateral wall, a cylindrical channel (30) in the bottom part of which is housed a vertical journal (32) formed on a top edge of the cup (8) of the cartridge, so that a pivoting of the cap (18) about the journal (32) on the cup (8) allows the said cup to open or close.

3. Infusion machine according to claim 2, wherein the said journal (32) on the cup (8) has on its side a nose piece (35) engaged non-detachably in a slide (36) which is substantially semi-circular, provided in the lateral wall (28) of the cap (18) of the cartridge (7).

4. Infusion machine according to claim 2, wherein the cup (8) and the cap (18) of the cartridge (7) have, on the side opposite to the journal-channel unit, cooperating means (38, 39) of removable fixing.

5. Infusion machine according to claim 4, wherein the removable fixing means include a lug (38) formed at the base of the lateral wall (28) of the cap (18) and snapping into a suitable notch (39) produced in a small vertical flange (41) formed on the edge of the cup (8).

6. Infusion machine according to claim 2, comprising a non-return valve (4) interposed between the outlet from the container (1) and the inlet to the water heater (3), wherein the cup (8) of the cartridge (7) extends vertically, from the bottom (12) of the container (1), over only part of the depth of the basin (10), and the journal (32) on the cup (8) is hollow and opens out, on the one hand, directly into the channel (30) of the cap (18) and, on the other hand, into the said basin (10) via a corresponding opening (53) made in the cup (8), so that the space (55) provided between the base (49) of the cup (8) and the base (56) of the basin (10), as well as the said channel (30) of the cap, constitute a buffer storage (57) located upstream of the said valve (4), this buffer storage (57) having at least one orifice open to atmosphere (58) made in the top part of the lateral wall (28) of the cap (18) of the cartridge (7).

7. Infusion machine according to claim 2, wherein the opening (42;43) through which the water from the container enters the cap (18) of the cartridge (7) consists of a gap which is formed in the area where the cap (18) and the cup (8) of the cartridge join and which opens out above the filter sachet (15), the said cap (18) of the cartridge (7) having, in the top part of its lateral wall, at least one orifice open to atmosphere (47).

8. Infusion machine according to claim 2, wherein the container (1) has a cover (23) comprising an opening (22) for the cartridge to be inserted, which is located directly above the basin (10), and an opening (27) for filling the container, the cap (18) of the cartridge (7) having gripping means (26a–26b) designed for the removal of the cartridge.

9. Infusion machine according to claim 1, wherein the filter sachet (15) is made of felt.

* * * * *